US012473772B2

(12) United States Patent
Wegner

(10) Patent No.: US 12,473,772 B2
(45) **Date of Patent: *Nov. 18, 2025**

(54) METHOD FOR OPERATING A DOOR ACTUATOR

(71) Applicant: dormakaba Deutschland GmbH, Ennepetal (DE)

(72) Inventor: Frank Wegner, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 344 days.

This patent is subject to a terminal disclaimer.

(21) Appl. No.: 17/668,097

(22) Filed: Feb. 9, 2022

(65) Prior Publication Data

US 2022/0268087 A1 Aug. 25, 2022

(30) Foreign Application Priority Data

Feb. 12, 2021 (EP) .................................... 21156790

(51) Int. Cl.
*E05F 15/73* (2015.01)

(52) U.S. Cl.
CPC ........... *E05F 15/73* (2015.01); *E05Y 2400/44* (2013.01); *E05Y 2400/45* (2013.01); *E05Y 2900/132* (2013.01)

(58) Field of Classification Search
CPC .. E05F 15/73; E05Y 2400/44; E05Y 2400/45; E05Y 2900/132; E05Y 2400/36; E05Y 2400/456; E05Y 2800/00; E05Y 2800/205
See application file for complete search history.

(56) References Cited

U.S. PATENT DOCUMENTS

| | | | | |
|---|---|---|---|---|
| 5,583,405 | A | 12/1996 | Sai et al. | |
| 5,647,173 | A | 7/1997 | Stark et al. | |
| 6,084,367 | A * | 7/2000 | Landert | E05F 15/608 318/283 |
| 2011/0094160 | A1* | 4/2011 | Houser | E05F 15/63 49/31 |
| 2011/0227746 | A1* | 9/2011 | Houser | E05F 3/22 248/220.21 |
| 2013/0259306 | A1* | 10/2013 | Lee | E05F 15/74 382/106 |
| 2016/0024831 | A1* | 1/2016 | Houser | E05F 15/60 49/506 |
| 2018/0139378 | A1 | 5/2018 | Moriuchi et al. | |

(Continued)

FOREIGN PATENT DOCUMENTS

| | | | |
|---|---|---|---|
| DE | 19613178 | A1 | 10/1997 |
| DE | 20320497 | U1 | 11/2004 |

(Continued)

*Primary Examiner* — Santosh R Poudel

(74) *Attorney, Agent, or Firm* — CANTOR COLBURN LLP

(57) ABSTRACT

A method for operating a door actuator of a pivot leaf door, having a pivotable door leaf, includes at least the following steps: performing a pivot movement of the door leaf; and identifying an interaction between the door leaf and a person and determining a correction value for the pivot movement of the door leaf based on the interaction and correcting future pivot movements of the door leaf by the correction value. A door actuator of a door system is configured to carry out the method.

10 Claims, 3 Drawing Sheets

(56) References Cited

U.S. PATENT DOCUMENTS

| | | | | |
|---|---|---|---|---|
| 2020/0095818 | A1* | 3/2020 | Lee | F25D 29/005 |
| 2020/0206920 | A1* | 7/2020 | Ma | G06F 11/3476 |
| 2021/0065489 | A1* | 3/2021 | Hass | G07C 9/27 |
| 2021/0254385 | A1 | 8/2021 | Ishida et al. | |
| 2022/0298845 | A1* | 9/2022 | Soderqvist | E05F 1/006 |

FOREIGN PATENT DOCUMENTS

| | | | |
|---|---|---|---|
| DE | 102016119339 | A1 | 4/2018 |
| DE | 102019002397 | A1 | 11/2019 |
| EP | 0696670 | A1 | 2/1996 |
| EP | 3613933 | A1 | 2/2020 |

* cited by examiner

METHOD FOR OPERATING A DOOR ACTUATOR

CROSS-REFERENCE TO RELATED APPLICATIONS

This application is related to and claims the benefit of European Patent Application No. 21156790.4, filed on Feb. 12, 2021, the contents of which are herein incorporated by reference in their entirety.

TECHNICAL FIELD

The disclosure relates to a method for operating a door actuator of a door system, in particular of a pivot leaf door having a pivotable door leaf. The disclosure is also aimed at a door actuator of a door system for carrying out a method according to the disclosure.

BACKGROUND

EP 3 613 933 A1 discloses a method for operating an automatic door system which has a door actuator connected to a door leaf. It is indicated here that radar movement detectors are used to actuate the door movement for automatic sliding doors. For swing leaf doors, radar sensors are not common for detecting monitored regions if the sensors ultimately detect people and transmit corresponding data to a control unit to control the door system.

A method for operating an automatic door system is also known from DE 196 13 178 A1 and the door system has a door leaf which can be actuated via a door actuator. Furthermore, sensor units are proposed which cooperate with a control unit and the control unit can be actuated using sensor data such that the door system is optimally operated. Optimum operation of the door system is in particular seen as the opening behavior of the door system adapting to the passage frequency of the passing people. Thus, if a greater number of people pass the door system, the opening behavior should be designed differently to if only a single person passes the door system. Additionally, weather conditions, the time of day, the day of the week and, for example, also a temperature difference between the inside and outside of a building should also be taken into consideration.

In this case, an ideal condition is considered a door only opening as wide as is required for one or a plurality of people to pass through. In particular, the door should open and close at the correct location, for example when it concerns multi-leaf door systems, in particular concerning sliding doors. The aim here is to actuate one or a plurality of door leaves such that, when passing the door system, a person can continue their walking movement in the movement path unchanged, but the door leaf does not open earlier than is necessary and also does not close later than is necessary. Thus, a smart door should be provided with which it should be possible to control the opening and closing behavior of a complete door system as a function of the traffic situation and of environmental conditions such as temperature, wind, pressure difference, need for air exchange and similar parameters.

Door systems are essentially provided with a factory pre-setting which ultimately have to be adjusted by an installer on-site to the specifications of the point of use, which is often complex and often leads to multiple, subsequent operations on-site. For example, the door leaf movement of a door system in use at a hospital must be controlled differently to one used in a school, in a nursing home or in a public building.

SUMMARY

The disclosure further improves a method for operating a door system as well as to provide such a door system with which the method according to the disclosure can be carried out. The improvement should in particular be to easily configure an optimal actuation of the door leaves of the door system such that the walking movement of the passing person is not impeded as far as possible after the door system has been configured on-site.

According to the disclosure, the method has at least the following steps: Performing a pivot movement of the door leaf, Identifying an interaction between the door leaf and a person and determining a correction value for the pivot movement of the door leaf based on the interaction and correcting future pivot movements of the door leaf by the correction value.

The core idea of the disclosure is to provide a door system with a learning door actuator which is continuously optimized by the learning property over the, in particular, initial service life at the point of use. Therefore, there is the possibility of installing a door system with standard factory settings at the point of use without the controller having to be complexly adapted to the usage conditions by a technician. The actuation of the door leaf is adapted over the, primarily initial, service life of the door system by correction values being recorded through interaction with people entering and in particular stored which form the basis for the actuation of future pivot movements of the door leaf. Consequently, the learning door actuator can configure and optimize itself in the course of its service life, in particular in the initial period, as long as the interactions between the people entering and the door leaf reach a minimum. It is only then assumed that there is a certain level of satisfaction concerning the movement behavior of the door leaf for people entering and the people entering the door system no longer interact with the door leaf. An optimum determined in this way for the operation of the door system consequently forms the basis for the future operation of the door system.

To carry out the method, a sensor unit is in particular configured with which the at least one person is detected and with the door actuator having a control unit with which information is received from the sensor unit about the presence and/or about the spatial distance and movement of the people, with the pivot movement of the door leaf being performed based on the information recorded by the sensor unit and also based on the correction value. The correction value can in particular be applied where the control unit controls the actual wiring of a drive unit in the door actuator. The correction values can therefore for example bring forward or delay the opening time of the door leaf, accelerate or slow down the opening speed of the door leaf or the angle position of the door leaf in the opening position can be configured to be enlarged or reduced. In the same way, the opening hold period, the closing speed and lastly also the response threshold of the door actuator can also be set when a person is detected by the sensor unit by the setting taking place through the automated optimization according to the disclosure.

Particularly advantageously, the control unit has a correction value memory in which correction values are stored. The correction values can be stored in the correction value memory, in particular cumulatively, preferably permanently, but at least in a volatile manner. It is also provided that the correction values are optimized in the correction value memory preferably via an algorithm over the, in particular, initial service life of the pivot leaf door by the correction values for future pivot movements of the door leaf being defined in a prioritized manner such that the future number of interactions between the door leaf and the people entering the pivot leaf door is minimized. When the algorithm is designed, the priority is consequently set for the correction values which generate as little interaction as possible between the people entering and the door leaf. Therefore, the optimum can be found via the algorithm itself, for which a number of correction values is stored for a longer time period, which are ultimately evaluated such that the correction values, which have generated a minimum of interactions between the person entering and the door leaf, form the basis of the future control of the door leaf.

The interaction between the door leaf and the person can take place in a different manner. For example, the interaction relates to a deliberate behavior of the person. Then, the interaction between the door leaf and the person can relate to an interruption, a slowing down and/or a stopping of the walking movement of the person just before the person passes through the pivot leaf door. It is also possible that the interaction relates to an acceleration of the walking movement of the person just before the person passes through the pivot door. Lastly, it is conceivable that the interaction between the door leaf and the person relates to a pushing of the opening movement of the door leaf. The pushing can be carried out during the opening movement or also in the opening position of the door leaf, for example if the door leaf opens either too slowly such that the person assists the opening movement, or the door leaf is not opened sufficiently wide in the opening position such that the person wants a greater opening angle and consequently pushes the door leaf into a further opening position.

According to a process-related further development of the method according to the disclosure, it can be provided that the correction value for the pivot movement of the door leaf is determined based on the interaction with a number of people in connection with the time of day and/or with the day of the week. Thus, correction values can also be provided which are stored depending on the time of day or depending on the day of the week. Furthermore, correction values can be made dependent on a difference between the inside and outside temperature of the building or correction values are made dependent on the season. Furthermore, wind loads, pressure differences between the inside and the outside of a building and/or sunshine can also form further parameters which are correlated with the correction values such that these further parameters also form the basis of the time-dependent or situation-dependent control of the pivot movement of the door leaf. If the people entering the door system, for example in the case of very low outside temperatures, regularly push the door leaf or hold it open manually or with their foot, then a weaker correction factor is formed than in the case of very high outside temperatures. The same can be provided in the case of wind loads, temperature differences and/or pressure differences between the inside region and the outside region of the building in which the door system is configured.

It is preferably also provided that the correction value for the pivot movement of the door leaf is determined based on the interaction with the person in conjunction with a recorded approach speed and/or with a recorded size of the person. Therefore, the correction value is also stored in conjunction with the recorded approach speed and/or the recorded size of the person entering. It is also conceivable to determine an approach angle of the person at which the person moves towards the door system. Therefore, the door actuator can also learn to optimally actuate the movement of the door leaf dependent on the approach angle such that for example for people, who approach the door system obliquely from the closure side of the door leaf, the door leaf only opens partially, and the opening angle of the partial opening can be optimized via the learning algorithm according to the disclosure.

Lastly, the interactions between the door leaf and a number of people can also generate a matrix, a table or a list over a time frame, in particular over a day or over a week, in which the correction values are stored, in particular in the correction value memory, depending on the time of day and/or on the day of the week and/or on the other environmental influences such as for example the season.

The disclosure is also aimed at a door actuator for carrying out a method according to the above description. In this case, a control unit with a correction value memory is formed. Lastly, the door actuator has a drive unit with a sensor for recording the interaction between the door leaf and a person.

Features and details, which are described in connection with the method according to the disclosure, also apply here in connection with the door actuator according to the disclosure and vice versa. In this case, the features mentioned in the description and in the claims may each be essential to the disclosure individually by themselves or in combination. In particular, a door actuator is being protected with which the method according to the disclosure, in particular the method according to one of the claims, can be carried out.

The disclosure is also aimed at a door system for carrying out the method according to the disclosure. The door system comprises at least one, in particular a plurality of, in particular two, door leaves. The door system preferably comprises a door actuator according to the disclosure. The door system or the door actuator comprises a memory and/or a processor for carrying out the method.

The door system can be designed as an, in particular automatic, sliding door system, as a folding leaf door system, as a pivot leaf door system or as a revolving door system.

Features and details, which are described in connection with the method according to the disclosure and the door actuator according to the disclosure, also apply here in connection with the door system according to the disclosure and vice versa.

The disclosure is also aimed at a computer program product for carrying out the method according to the disclosure. Features and details, which are described in connection with the method according to the disclosure and the door actuator according to the disclosure as well as the door system according to the disclosure, also apply here in connection with the computer program product according to the disclosure and vice versa.

BRIEF DESCRIPTION OF THE DRAWINGS

Further measures that improve the disclosure will be outlined in greater detail below together with the description of a preferred exemplary embodiment of the disclosure on the basis of the figures, in which is shown.

DETAILED DESCRIPTION OF THE DRAWINGS

Figure 1:
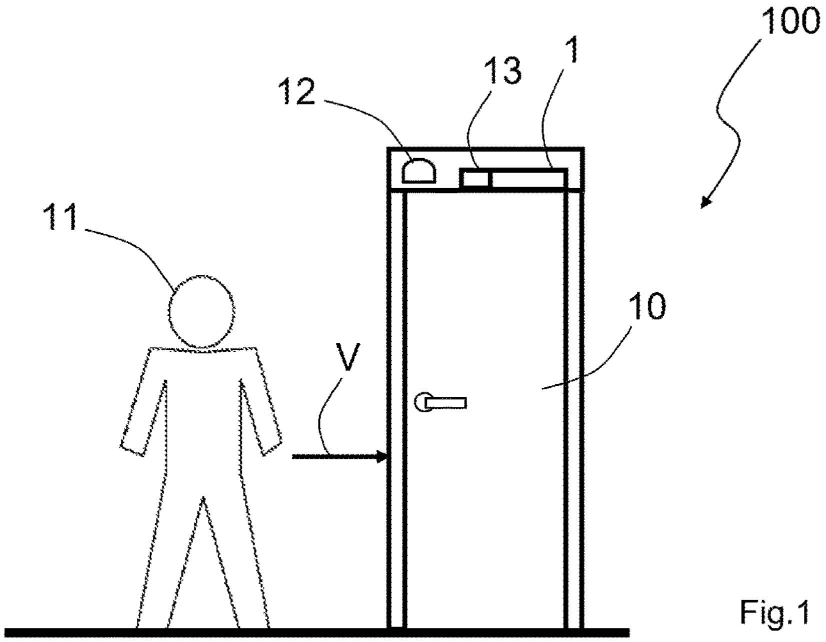
FIG. 1 a schematic view of a door system which is designed to carry out the method according to the disclosure, with a person being shown before the door leaf and who does not interact with the door leaf, FIG. 2 the view according to FIG. 1, with the person interacting with the door leaf, FIG. 3 a diagram representation with a speed of the movement of a person over a time on approach towards a door system and with the speed increasing as the door system is approached, FIG. 4 a diagram representation of a speed of the movement of a person over the time according to FIG. 3, with the speed of the person slowing down when or just before the door opens, and FIG. 5 a schematic view of a door system having a door actuator operatively connected to a door leaf.
Figure 2:
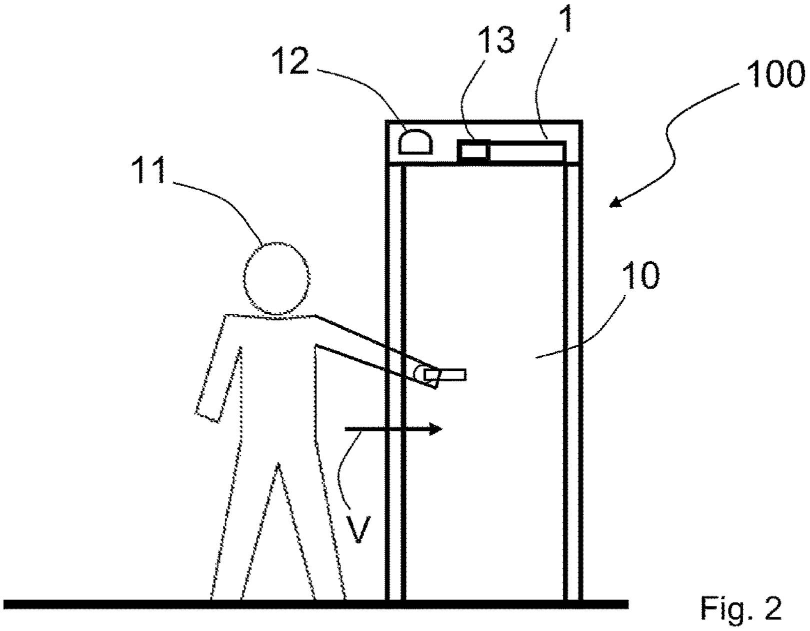

A door system 100 is shown in each of FIGS. 1 and 2 which has a door leaf 10 which can be automatically opened with a door actuator 1. A person 11 is represented before the door system 100 and approaches the door system 100 at a speed v.

The approach is recorded with a sensor unit 12 which is particularly advantageously designed as a radar sensor. Therefore, the sensor unit 12 can detect not only the mere presence of the person 11, but an approach speed, an approach direction and, if applicable, also the size of the person 11, can also be detected with a sensor unit 12 having a radar sensor. The recorded sensor data of the sensor unit 12 is then transmitted to a control unit 13 which is for example part of the door actuator 1, but can also be arranged externally to the door actuator 1. Lastly, the control unit 13 serves to actuate the door actuator 1 in order to initiate a movement in the door leaf 10 and consequently to open and close the same.

FIG. 1 shows the person 11 without an interaction with the door leaf 10, whereas FIG. 2 shows by way of example that the person 11 actuates the door leaf 10 by hand in addition to the automatic actuation by the door actuator 1. This manual actuation is detected by the door actuator 1 and a correction value is determined in order to perform a correction for future pivot movements of the door leaf 10 in such manner that the person 11 is, as far as possible, no longer compelled to interact with the door leaf 10.

Figure 3:
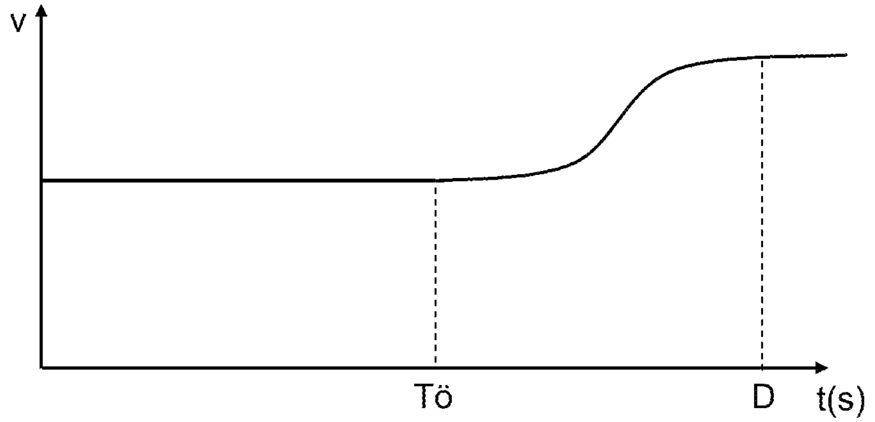
Figure 4:
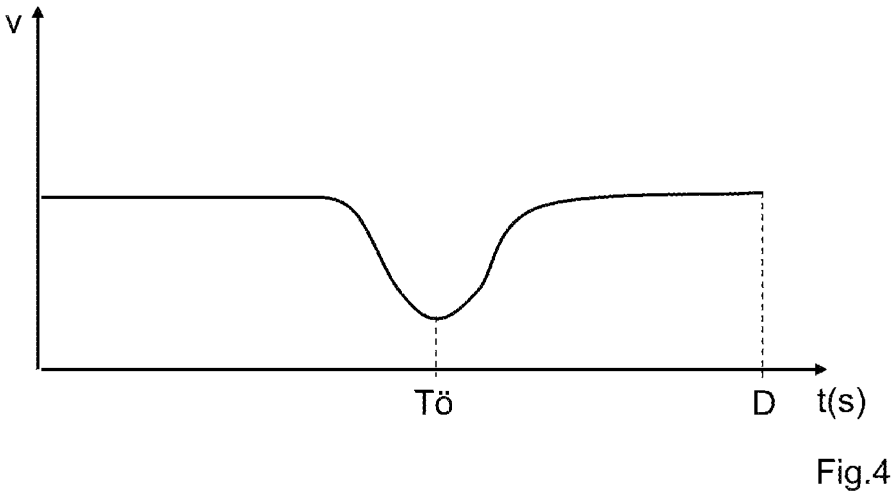

FIGS. 3 and 4 show by way of example a non-manual or non-tactile way of interacting with the door leaf 10. A walking speed v of the person 11 over a time tin seconds s is shown, with the person 11 first approaching the door system 100 at a roughly constant speed until a door opening time TO. The behavior of the person 11 can be recorded by means of the sensor unit 12 and transmitted to the control unit 13.

FIG. 3 shows by way of example a door opening time TO which is stored such that the person 11 must increase their walking speed in order to ultimately reach a passage time D in which the door leaf 10 is still open. As a result, it can be read from this diagram that either the door opening time TO is designed to be too early or the door leaf 10 closes again although the passage time D of the person when passing through the door system 100 is still not reached. This interaction can be recorded by means of the sensor unit 13. FIG. 4, in contrast, shows a door opening time TO which is stored such that the person must reduce the walking speed v in order to for example wait for the door to open in order to ultimately pass the door system 100.

Therefore, the delay must take place in order to reach the passage time D at the correct time in which the door leaf 10 is held as far as possible in the opening position.

Both cases according to FIGS. 3 and 4 show ways of interacting which is attributable solely to the behavior of the person 11 who passes the door system 100. In this respect, a haptic interaction between the person 11 and the door leaf 10 does not necessarily have to take place and a behavior of a person 11 can also be detected by the sensor unit from which an optimization of the actuation of the movement of the door leaf 10 can be derived.

Figure 5:
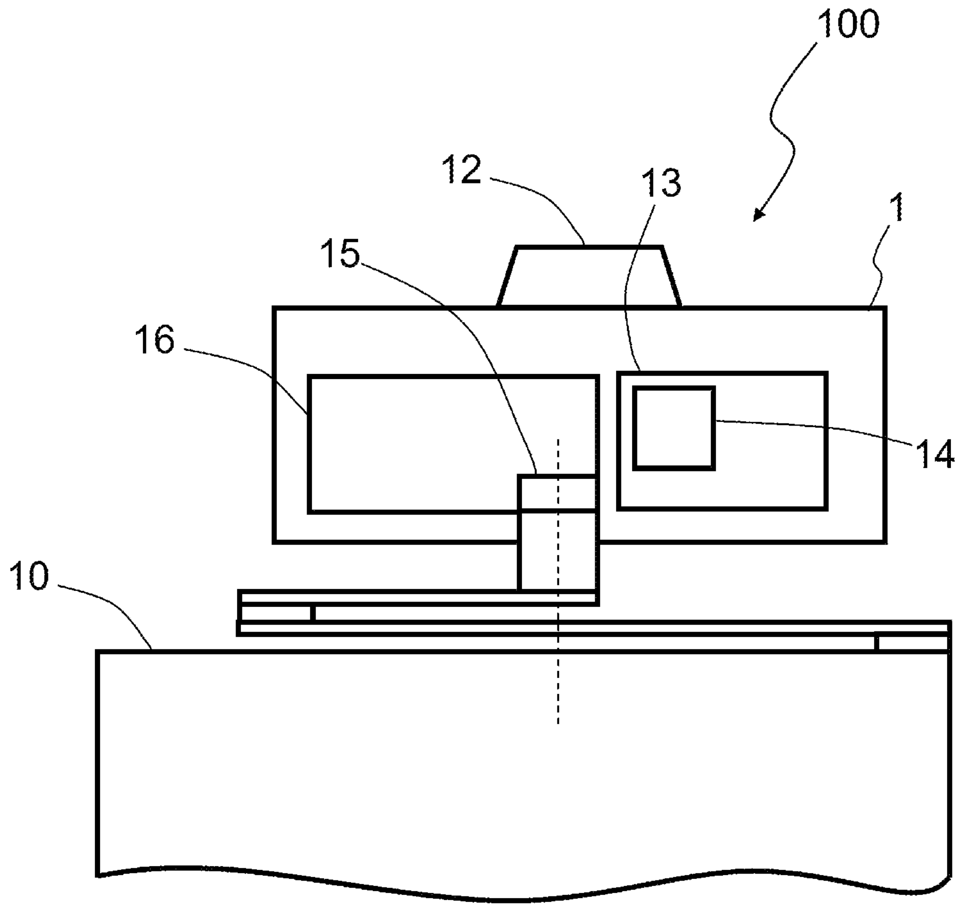

FIG. 5 lastly shows a structure of a door system 100 with a door actuator 1 which is operatively connected to a door leaf 10. The operative connection comprises a sensor 15 or the sensor 15 is coupled to the operative connection and can detect whether external forces are applied to the door leaf 10, for example if a person pushes a door leaf or pulls it back to the closure position. The information from the sensor 15 can be transmitted to the control unit 13 which ultimately comprises a correction value memory 14. Therefore, the actuation of the drive unit 16 can be continuously optimized via the control unit 13 and the correction values stored in the correction value memory 14 in order to continuously improve the behavior of the door leaf 10 for the specified point of use. In this case, the control unit 13 receives additional information from the sensor unit 12 which is by way of example designed as a radar sensor and serves to detect the people 11.

The design of the disclosure is not restricted to the preferred exemplary embodiment indicated above. In fact, a number of variants is conceivable which make use of the solution represented even in the case of essentially different embodiments. All features and/or advantages emerging from the claims, the description or the drawings, including constructive details or spatial arrangements, may be essential to the disclosure by themselves and in the most varied combinations.

The invention claimed is:

1. A method for operating a door actuator of a door system, having a pivotable door leaf, the method including the following steps:

performing a pivot movement of the door leaf, identifying an interaction between the door leaf and at least one person, determining a correction value for the pivot movement of the door leaf based on the interaction, and correcting future pivot movements of the door leaf by the correction value, wherein the interaction between the door leaf and the at least one person is one of pushing the door leaf, an interruption of the walking movement, a slowing down of the walking movement, a stopping of the walking movement, and an acceleration of the walking movement, wherein the correction values are optimized in a correction value memory via an algorithm over the initial service life of the pivot leaf door by the correction values for future pivot movements of the door leaf being defined in a prioritized manner such that the future number of interactions between the door leaf and the at least one person entering the pivot leaf door is minimized, wherein at least one sensor unit is configured with which the at least one person is detected and wherein the door actuator has a control unit with which information is received from the sensor unit about presence and/or about spatial dimensions and movements of the at least one person, wherein the pivot movement of the door leaf is performed based on the information recorded by the sensor unit and also based on the correction value.

2. The method according to claim 1, wherein the control unit has the correction value memory, in which correction values are stored.

3. The method according to claim 2, wherein the correction values are stored cumulatively in the correction value memory.

4. The method according to claim 1, wherein the interaction between the door leaf and the at least one person relates to a deliberate behavior of the at least one person.

5. The method according to claim 1, wherein the correction value for the pivot movement of the door leaf is determined based on the interaction with a number of people in connection with the time of day and/or with the day of the week.

6. The method according to claim 1, wherein the correction value for the pivot movement of the door leaf is determined based on the interaction with the at least one person in conjunction with a recorded approach speed and/or with a recorded size of the at least one person.

7. The method according to claim 1, wherein the interactions between the door leaf and a number of people will generate a matrix, a table or a list over a time frame, in which the correction values are stored, in particular in the correction value memory.

8. A door actuator for carrying out a method according to claim 1.

9. The door actuator according to claim 8, wherein a control unit is provided with the correction value memory.

10. The door actuator according to claim 9, wherein a drive unit is provided which is at least indirectly coupled to the door leaf and wherein the drive unit is designed with a sensor configured for detecting an interaction between the door leaf and a person.

* * * * *